United States Patent
Zhang et al.

(10) Patent No.: US 7,990,920 B2
(45) Date of Patent: Aug. 2, 2011

(54) TRANSMIT DIVERSITY FOR ACKNOWLEDGEMENT AND CATEGORY 0 BITS IN A WIRELESS COMMUNICATION SYSTEM

(75) Inventors: Jianzhong Zhang, Irving, TX (US);
Zhouyue Pi, Richardson, TX (US);
Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 753 days.

(21) Appl. No.: 12/105,176

(22) Filed: Apr. 17, 2008

(65) Prior Publication Data

US 2008/0267158 A1    Oct. 30, 2008

Related U.S. Application Data

(60) Provisional application No. 60/924,020, filed on Apr. 26, 2007, provisional application No. 60/924,339, filed on May 9, 2007.

(51) Int. Cl.
*H04B 7/02* (2006.01)
*H04L 1/02* (2006.01)

(52) U.S. Cl. ........ 370/329; 370/338; 370/344; 375/260; 375/267; 455/101

(58) Field of Classification Search .......... 370/200–210, 370/328, 329, 338, 342, 344, 349; 375/130, 375/260, 267, 295, 296, 299, 316, 347; 455/101, 455/102, 108, 132, 272, 257, 317
See application file for complete search history.

(56) References Cited

U.S. PATENT DOCUMENTS

| | | | | |
|---|---|---|---|---|
| 5,689,439 A | * | 11/1997 | Weerackody et al. | 370/329 |
| 6,760,318 B1 | * | 7/2004 | Bims | 370/332 |
| 7,039,370 B2 | * | 5/2006 | Laroia et al. | 455/101 |
| 7,302,009 B2 | * | 11/2007 | Walton et al. | 375/267 |
| 2005/0157806 A1 | | 7/2005 | Walton | |

FOREIGN PATENT DOCUMENTS

| | | | |
|---|---|---|---|
| KR | 10-2006-0043800 | | 5/2006 |
| KR | 1020060043800 | * | 5/2006 |
| WO | WO 2004/038951 | | 5/2004 |

OTHER PUBLICATIONS

*3GPP Organizational Partners (ARIB, ATIS,CCSA, ETSI, TTA, TTC), "3rd Generation Partnership Project; Technical Specification Group Radio Access Network; Physical layer aspects for evolved Universal Terrestrial Radio Access (UTRA) (Release 7)", 2006.*

* cited by examiner

*Primary Examiner* — Afsar M. Qureshi

(57) ABSTRACT

A method of transmitting acknowledgement/nonacknowledgement (ACK/NACK) signals including multiplexing ACK/NACK signals; and repeatedly transmitting for predetermined times the multiplexed signal with each of repetitions of transmitting the multiplexed signal being spread in a frequency domain and being mapped to a plurality of discrete resource units each having a pair of neighboring subcarriers and a predetermined number of Orthogonal Frequency Division Multiplexing (OFDM) control symbols.

A method for transmitting Category 0 bits, including modulating the Category 0 bits; repeatedly transmitting the modulated Category 0 bits with each of repetitions of transmitting the modulated Category 0 bits being spread in a frequency domain and being mapped to a plurality of discrete resource units each having a pair of subcarriers and a predetermined number of OFDM control symbols; and mapping the modulated Category 0 bits by a frequency selective transmit diversity (FSTD).

33 Claims, 12 Drawing Sheets

|     | t1    | t2       |
|-----|-------|----------|
| ANT1 | $S_1$ | $-S_2^*$ |
| ANT2 | $S_2$ | $S_1^*$  |

Figure 2

|     | f1    | f2       |
|-----|-------|----------|
| ANT1 | $S_1$ | $-S_2^*$ |
| ANT2 | $S_2$ | $S_1^*$  |

Figure 3

TRANSMIT DIVERSITY FOR ACKNOWLEDGEMENT AND CATEGORY 0 BITS IN A WIRELESS COMMUNICATION SYSTEM

CLAIM OF PRIORITY

This application makes reference to, incorporates the same herein, and claims all benefits accruing under 35 U.S.C. §119 from provisional applications earlier filed in the U.S. Patent & Trademark Office on 26 Apr. 2007 and there duly assigned Ser. No. 60/924,020, and on 9 May 2007 and there duly assigned Ser. No. 60/924,339, respectively.

BACKGROUND OF THE INVENTION

1. Field of the Invention

The present invention relates to methods and apparatus of transmitting Acknowledgement (ACK) and Category 0 bits in a Wireless communication System, and more particularly, to process and apparatus of transmitting Acknowledgement (ACK)/NonAcknowledgement (NACK) and Category 0 bits minimizing the usage of base-station resources in both transmission power and time-frequency transmission opportunity for a designated target coverage at a designated bit error rate.

2. Description of the Related Art

Two references of the present invention are listed as follows:

[1] 3GPP RAN WG1#48bis Chairman's Notes, March 2007, Malta; and
[2] R1-050271, "Evaluation of Diversity in Evolved UTRA", Samsung, RAN1#40bis, Beijing China, April 2005.

The transmit diversity for ACK (Acknowledgement) channel and Cat0 (Category 0) bits has not been fully developed in the contemporary Long Term Evolution (LTE) standard specification. For the ACK channel, a complete solution that encompasses multiplexing, resource mapping and transmit diversity has not yet been proposed. For Cat0, the baseline assumption of SFBC (Space Frequency Block Coding) results in unnecessary additional UE (user equipment) complexity. This is because the fact that SFBC (Space Frequency Block Coding) works most efficiently with two modulated symbols at a time, while Cat0 bits only form one modulated symbol.

Orthogonal Frequency Division Multiplexing (OFDM) is a technology to multiplex data in frequency domain. Modulation symbols are carried on frequency sub-carriers. The total bandwidth in an OFDM system is divided into narrowband frequency units called subcarriers. The number of subcarriers is equal to the FFT/IFFT size N used in the system. As a general rule, the number of subcarriers used for data is less than N because some of the subcarriers located at the edge of the frequency spectrum are reserved as guard subcarriers. As a general rule, no information may be transmitted on guard subcarriers.

A typical cellular radio system includes a collection of fixed base stations (BS) that define a radio coverage area or a cell. Typically, a non-line-of-sight (NLOS) radio propagation path exists between a base station and a mobile station due to natural and man-made objects that are situated between the base station and the mobile station. As a consequence, the radio waves propagate via reflections, diffractions and scattering. The arriving waves at the mobile station (MS) in the downlink direction (at the BS in the uplink direction) experience constructive and destructive additions because of different phases of the individual waves. This is due the fact that, at high carrier frequencies typically used in the cellular wireless communication, small changes in the differential propagation delays introduces large changes in the phases of the individual waves. When the MS is moving or when any change occurs in the scattering environment, the spatial variations in the amplitude and phase of the composite received signal will manifest themselves as the time variations known as Rayleigh fading or fast fading. The time-varying nature of the wireless channel requires very high signal-to-noise ratio (SNR) in order to provide desired bit error or packet error reliability.

Diversity is widely used to combat the effects of fast fading. The idea is to provide the receiver with multiple faded replicas of the same information-bearing signal. On the assumption of independent fading on each of the antenna branches, the probability that the instantaneous SNR is below a certain threshold on each branch is approximately $p^L$ where p is the probability that the instantaneous SNR is below the certain threshold on each antenna branch.

The methods of diversity that are suitable for use fall into the following categories: space, angle, polarization, field, frequency, time and multipath diversity. Space diversity may be achieved by using multiple transmit or receive antennas. The spatial separation between the multiple antennas is chosen so that the diversity branches experience fading with little or no correlation of the signals during the transit between the transmitting and receiving antennas. Transmit diversity uses multiple transmitting antennas in order to provide the receiver with multiple uncorrelated replicas of the same signal. Transmit diversity schemes may further be divided into open loop transmit diversity and closed-loop transmit diversity schemes. In an open loop transmit diversity approach, no feedback is required from the receiver. In one known arrangement of a closed loop transmit diversity, the receiver computes the phase and amplitude adjustment that should be applied at the transmitter antennas to maximize the received signal power at the receiver. In another arrangement of the closed loop transmit diversity referred to as selection transmit diversity (STD), the receiver provides feedback information to the transmitter on antenna(s) to be used for transmission.

Hybrid Automatic Repeat reQuestion (HARQ) is widely used in communication systems to combat decoding failure and improve the reliability of data transmission.

N-channel synchronous Hybrid Automatic Repeat reQuestion (HARQ) is often used in wireless communication systems because of the simplicity. For example, synchronous Hybrid Automatic Repeat reQuestion (HARQ) has been accepted as the Hybrid Automatic Repeat reQuestion (HARQ) scheme for long term evolution (LTE) uplink in 3GPP.

Typically, there is more than one user sharing the uplink resource in the uplink using HARQ, resulting a need for the base-station to send multiple ACK signals in the downlink. These DL (down link) ACK channels should be multiplexed and transmitted using the available transmit diversity scheme at the base-station, in order to minimize the base-station resources usage in both transmission power and time-frequency transmission opportunity, for a given target coverage at a given bit error rate requirement. The solution in achieving this goal is not completed.

Dynamic Category 0 (Cat 0) bits is a LTE terminology used in 3GPP LTE standard body, which may also be referred to as PCFICH (i.e., physical control format indicator channel) The role of Cat0 is to support dimensioning (scaling) of the downlink control channel by indicating the number of downlink and uplink scheduling grants. The current working assumption 3GPP RAN WG1#48bis Chairman's Notes, March 2007, Malta is that the dynamic Cat0 bits has a maximum size of two bits, and should be transmitted every subframe where a control channel element (CCE) is present. The information conveyed by Cat0 bits includes, but not limited to, the number of OFDM symbols used for all control channels in the subframe. The transmit diversity of the Cat0 bits is not finalized, and it is the objective of the present invention to provide a simple and efficient transmit diversity scheme that captures both spatial and frequency diversity in the channel.

SUMMARY OF THE INVENTION

It is therefore an object of the present invention to provide an improved process and apparatus of transmitting Acknowledgement (ACK) in order to minimize a usage of base-station resources in both transmission power and time-frequency transmission opportunity for designated target coverage at designated bit error rate.

It is another objective of the present invention to provide a simple and efficient transmit diversity scheme that captures both spatial and frequency diversity in a Cat0 channel.

In an embodiment of the present invention, CDM (Code Division Multiplexing) is used in conjunction with cell-specific scrambling, in order to take advantage of interference averaging for a given repetition/transmission of the ACK channel, and ensure interference randomization over several repetition/retransmission. Here, the spreading length of two may be selected, and the resulting signal vector after spreading is mapped to a 2×1 resource unit (RU). One RU covers two neighboring subcarriers and one Orthogonal Frequency Division Multiplexing (OFDM) symbol in the time-frequency resource mapping. In addition to the CDM method mentioned above, each signal vector a after spreading carries two BPSK-modulated (binary phase shift keying modulated) ACK bits. The multiplexing capacity however may be doubled if both of I and Q (real and imaginary) branches are applied to carry different ACK bits with different power settings.

A maximum power imbalance may be imposed on the set of ACK channels. With a reasonable value of the maximum power imbalance, the additional power needed for the low-power ACK channels is minimal. In addition to the limitation on the power imbalance, the Node-B may also try to put two ACK channels with similar power settings on the I and Q branches of the same complex symbol. The Node-B means base station in a cell.

The CDM multiplexing structure leads to a resource mapping method that consists of the following steps.

1. Each CDMed vector a is repeated R times, each repetition is mapped to a 2×1 RU; the number of total repetitions is fixed regardless of the number of Orthogonal Frequency Division Multiplexing (OFDM) control symbols N.

2. If N=1 Orthogonal Frequency Division Multiplexing (OFDM) symbol is used for control channels, then all R times of repetitions are transmitted in the first OFDM symbol, the R times of repetitions should be spread out in the frequency domain to capture frequency diversity. On the other hand, if N=2 or N=3 OFDM symbols are used, then these R times of repetitions may be spread out in both time and frequency domain to allow power sharing between OFDM symbols, while preserving the frequency diversity.

A method of mapping by using CDM (Code Division Multiplex)+SFBC (Space Frequency Block Coding)+repetition method is proposed. The CDM-ed vector a is transmitted R times in repetition. In each transmission, the 2 symbols [$a_1$,$a_2$] are mapped to a 2×1 RU using SFBC (Space Frequency Block Coding) across both of transmitting antennas. The same SFBC with repetition may be used for the N=2 and N=3 cases as well.

In another embodiment of the present invention, a CDM (Code Division Multiplex) of spreading length four is used in tandem with an I/Q domain multiplexing. An example of mapping by using CDM (Code Division Multiplex)+SFBC (Space Frequency Block Coding)+repetition method is proposed. In this case, a vector a having four symbols is transmitted repeatedly a predetermined number of times in the frequency domain. In each transmission, a 2×2 resource unit (RU) may be required.

An alternating method of mapping of two pairs of symbols of the vector a in different transmissions and the permutation of the pairs across different pairs of the symbols for the mapping method are proposed. In this case, the two pairs of symbols of vector a may be alternately mapped into different OFDM symbols at each of transmitting antennas.

In still another embodiment, the invention utilizes the following transmit diversity schemes for the transmission of Category 0 bits.

1. When four states are required for Cat0 bits, QPSK (quadrature phase-shift keying) modulation may be used; when three states are required for Cat0 bits, 3PSK (three phase shift keying) modulation may be used. The modulated Cat0 symbol is represented by a.

2. The Cat0 bits are always transmitted in the first Orthogonal Frequency Division Multiplexing (OFDM) symbol within a sub-frame.

3. The modulated symbol a is repeated by 2K times, and these resulted 2K symbols are mapped to 2×1 resource units (RU) where each RU includes two neighboring subcarriers in one OFDM symbol in the time-frequency resource mapping. K is the number of resource units (RUs).

4. A method combining Frequency selective transmit diversity (FSTD) and repetition method is used for two transmitting antennas.

Cell-specific hopping is one approach to avoid such consistent collision and to ensure interference averaging gain.

For the diversity order of 8, a repetition number in range of from 12 to 16 is likely needed for QPSK (quadrature phase-shift keying) modulated Cat0 symbol to ensure the "worst case" BER performance.

In still another embodiment of the present invention, the two subcarriers in the 2×1 is RU used for one repetition of the Cat0 bits may not be neighboring subcarriers.

In still another embodiment of the invention, for each repetition, the Cat0 symbol a is spread across space and frequency using an ortho-normal matrix onto the 2×1 RU that spans the two neighboring subcarriers. Some examples of transmission matrix T from this ortho-normal spreading include, but not limited to:

$$T_0 = \begin{bmatrix} a & -a^* \\ a & a^* \end{bmatrix}, T_1 = \begin{bmatrix} a & a^* \\ a & -a^* \end{bmatrix}, T_2 = \begin{bmatrix} a & a \\ a & -a \end{bmatrix}$$

$$T_3 = \begin{bmatrix} a & -a \\ a & a \end{bmatrix}, T_4 = \begin{bmatrix} a & -ja \\ a & ja \end{bmatrix}, T_5 = \begin{bmatrix} a & ja \\ a & -ja \end{bmatrix}.$$

Note that the row-permuted versions of the above matrices are also feasible ortho-normal spread matrices.

In still another embodiment of the present invention, the invention utilizes another transmit diversity scheme for the ACK channels such that:

1. Either one ACK channel is BPSK-modulated into a symbol or two ACK channels are both BPSK-modulated, but I/Q multiplexed into symbol a. No CDM is used in multiplexing.

2. An (FSTD+repetition) scheme may be used for the modulated ACK symbol.

In still another embodiment of the present invention, the present invention uses a (3,2,2) binary linear code to map the two Cat0 bits into a three-bit codeword $c_1c_2c_3$, and this codeword belongs to a codebook of size four with a minimum Hamming distance of two between any pairs of codewords. One example of such a codebook C is $c_1c_2c_3 \epsilon C = \{111, 100, 010\ 001\}$ when three states are carried by Cat0 bits. Once the 3-bit codeword is specified, it will be repeated and rate-matched to fit the 2K channel symbols to be used for the Cat0 bits. Here, QPSK (quadrature phase-shift keying) modulation is used for the coded channel bits. In addition, the rate-matching process is needed in the case if 4K is not divisible by three. In this case, the codeword $c_1c_2c_3$ is repeated $\lfloor 4K/3 \rfloor$ times (i.e., a quotient of 4K/3), and the resulting sequence is concatenated with the first $4K-3 \times \lfloor 4K/3 \rfloor$ (i.e., a remainder of 4K/3) bits in the codeword $c_1c_2c_3$. This concatenated bit sequence is the final channel bit sequence to be modulated and mapped into channel symbol.

In still another embodiment of the present invention, when three states need to be carried by 2 Cat0 bits, the choice of the codeword $c_1c_2c_3$ is limited to the subset of the codebook, where the size of this subset is three codewords. For example, one possible subset of the codebook C is $c_1c_2c_3 \epsilon C_{subset} = \{111, 100, 010\}$.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 shows an Alamouti 2×1 space-time diversity scheme;

FIG. 3 shows a Alamouti 2×1 space-frequency diversity scheme;

DETAILED DESCRIPTION OF THE INVENTION

The transmit diversity for ACK (Acknowledgement) channel and Cat0 (Category 0) bits has not been fully developed in the contemporary Long Term Evolution (LTE) standard specification. For the ACK channel, a complete solution that encompasses multiplexing, resource mapping and transmit diversity has not yet been proposed. For Cat0, the baseline assumption of SFBC (Space Frequency Block Coding) results in unnecessary additional UE (user equipment) complexity. This is due to the fact that SFBC (Space Frequency Block Coding) works most efficiently with two modulated symbols at a time, while Cat0 bits only form one modulated symbol.

Figure 1:
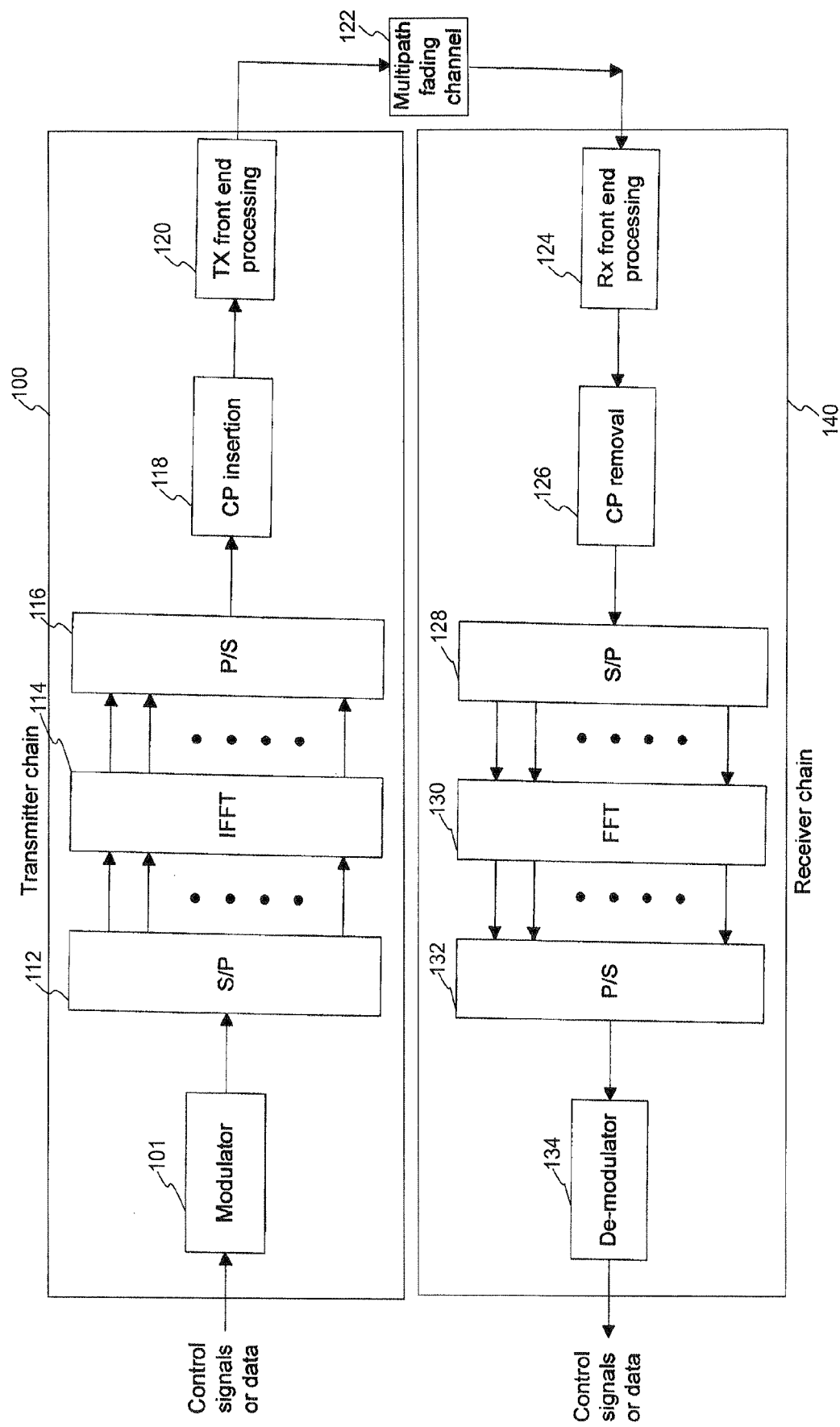
FIG. 1 illustrates an Orthogonal Frequency Division Multiplexing (OFDM) transceiver chain having a transmitter chain and a receiver chain.

Orthogonal Frequency Division Multiplexing (OFDM) is a technology to multiplex data in frequency domain. Modulation symbols are carried on frequency sub-carriers. FIG. 1 illustrate of an Orthogonal Frequency Division Multiplexing (OFDM) transceiver chain having a transmitter chain and a receiver chain. A sample of Orthogonal Frequency Division Multiplexing (OFDM) transceiver chain is shown in FIG. 1. At a transmitter chain 100, control signals or data signals are modulated by a modulator 101 and the modulated signals are serial-to-parallel converted by a serial-to-parallel convertor 112. An Inverse Fast Fourier Transform (IFFT) unit 114 is used to transfer the modulated signal or data from frequency domain to time domain, and the modulated signals transferred to the time domain is parallel-to-serial converted by a parallel-to-serial convertor 116. A cyclic prefix (CP) or zero prefix (ZP) is added to each OFDM symbol at a CP insertion stage 118 to avoid or alternatively, to mitigate the impact due to multipath fading at a multipath fading channel 122. Signals from cyclic prefix (CP) insertion stage 118 are applied to transmitter front end processing unit 120, for example, and to transmitting antennas (not shown on FIG. 1). Therefore, the signals transmitted by transmitter chain 100 are received by receiver chain 140. At a receiver chain 140, assuming that perfect time and frequency synchronization are achieved, signals received by receiver front end processing unit 124, for example, via receive antennas (not shown on FIG. 1), are processed at a cyclic prefix (CP) removal stage 126 which removes the cyclic prefix (CP) of the received signal. Signals processed in cyclic prefix (CP) removal stage 126 are further serial-to-parallel converted by a serial-to-parallel convertor 128. A Fast Fourier Transform (FFT) unit 130 transfers the received signals from the time domain to the frequency domain for further processing, including parallel-to-serial conversion by a parallel-to-serial convertor 132 and being demodulated by signal de-modulator 134.

The total bandwidth in an OFDM system is divided into narrowband frequency units called subcarriers. The number of subcarriers is equal to the FFT/IFFT size N used in the system. As a general rule, the number of subcarriers used for data is less than N because some of the subcarriers located at the edge of the frequency spectrum are reserved as guard subcarriers. As a general rule, no information may be transmitted on guard subcarriers.

A typical cellular radio system includes a collection of fixed base stations (BS) that define a radio coverage area or a cell. Typically, a non-line-of-sight (NLOS) radio propagation path exists between a base station and a mobile station due to natural and man-made objects that are situated between the base station and the mobile station. As a consequence, the radio waves propagate via reflections, diffractions and scattering. The arriving waves at the mobile station (MS) in the downlink direction (at the BS in the uplink direction) experience constructive and destructive additions because of different phases of the individual waves. This is due the fact that, at the high carrier frequencies typically used in the cellular wireless communication, small changes in the differential propagation delays introduce large changes in the phases of the individual waves. Additionally, when the MS is moving or changes occur in the scattering environment, the spatial variations in the amplitude and phase of the composite received signal will manifest themselves as the time variations known as Rayleigh fading or fast fading. The time-varying nature of the wireless channel requires very high signal-to-noise ratio (SNR) in order to provide desired bit error or packet error reliability.

Diversity is widely used to combat the effects of fast fading. The idea is to provide the receiver with multiple faded replicas of the same information-bearing signal. On the assumption of independent fading on each of the antenna branches, the probability that the instantaneous SNR is below a certain threshold on each branch is approximately $p^L$ where p is the probability that the instantaneous SNR is below the certain threshold on each antenna branch.

The methods of diversity that are suitable for use fall into the following categories: space, angle, polarization, field, frequency, time and multipath diversity. Space diversity may be achieved by using multiple transmit or receive antennas. The spatial separation between the multiple antennas is chosen so that the diversity branches experience fading with little or no correlation of the signals during the transit between the transmitting and receiving antennas. Transmit diversity uses multiple transmitting antennas in order to provide the receiver with multiple uncorrelated replicas of the same signal. Transmit diversity schemes may further be divided into open loop transmit diversity and closed-loop transmit diversity schemes. In an open loop transmit diversity approach, no feedback is required from the receiver. In one known arrangement of a closed loop transmit diversity, the receiver computes the phase and amplitude adjustment that should be applied at the transmitter antennas to maximize the received signal power at the receiver. In another arrangement of the closed loop transmit diversity referred to as selection transmit diversity (STD), the receiver provides feedback information to the transmitter on antenna(s) to be used for transmission.

An example of open-loop transmit diversity scheme is the Alamouti 2×1 space-time diversity scheme. FIG. 2 shows an Alamouti 2×1 space-time diversity scheme. In this approach during any symbol period, two data symbols are transmitted simultaneously from the two transmit antennas ANT1 and ANT2. Suppose during the first symbol interval t1, the symbols transmitted from ANT1 and ANT2 are denoted as $S_1$ and $S_2$ respectively as shown in FIG. 2. During the next symbol period, the symbols transmitted from ANT1 and ANT2 are $-S_2^*$ and $S_1^*$ respectively where x* represents the complex conjugate of x. With certain processing at the receiver, original symbols $S_1$ and $S_2$ may be recovered. Here, the instantaneous channel gain estimates h1 and h2 on ANT 1 and ANT 2, respectively, are required for faithful recovery at the receiver. This requires separate pilot symbols on both of the antennas in order to provide channel gain estimation at the receiver. The diversity gain achieved by Alamouti coding is the same as that which may be achieved in Maximum Ratio Combining (MRC).

A 2×1 Alamouti scheme may also be implemented in a space-frequency coded form. FIG. 3 shows a 2×1 Alamouti scheme implemented in a space-frequency coded form. In this case, the two symbols are sent on two different frequencies, i.e., subcarriers f1 and f2, for example, on different subcarriers in an Orthogonal Frequency Division Multiplexing (OFDM) system as shown in FIG. 3. When implemented in a space-frequency coded form in the open-loop transmit diversity scheme, the 2×1 Alamouti space-frequency diversity scheme illustrated by FIG. 3 shows an Alamouti 2×1 space-frequency diversity scheme in which during any symbol period, two data symbols are transmitted simultaneously from the two transmit antennas ANT1 and ANT2. If during the first frequency f1, the symbols transmitted from ANT1 and ANT2 are denoted as $S_1$ and $S_2$ respectively as shown in FIG. 3. During the next symbol period, the symbols transmitted from ANT1 and ANT2 are $-S_2^*$ and $S_1^*$ respectively where x* represents the complex conjugate of x. Original symbols $S_1$ and $S_2$ may be recovered by the receiver. Here, the instantaneous channel gain estimates h1 and h2 on ANT 1 and ANT 2, respectively, are required for faithful recovery at the receiver. This requires separate pilot symbols on both of the antennas in order to provide channel gain estimation at the receiver. The diversity gain achieved by Alamouti coding is the same as that which may be achieved in Maximum Ratio Combining (MRC).

The received signals $r_1$ and $r_2$ at the mobile station in subcarrier f1, r1, and in subcarrier f2, r2, may be written as:

$$r_1 = h_1 s_1 + h_2 s_2 + n_1$$
$$r_2 = -h_1 s_2^* + h_2 s_1^* + n_2 \quad (1)$$

where h1 and h2 are channel gains from ANT1 and ANT2 respectively. The assumption here is that the channel from a given antenna does not change between subcarriers f1 and f2. The mobile station performs equalization on the received signals and combines the two received signals (r1 and r2) in order to recover the symbols S1 and S2.

$$\hat{s}_1 = h_1^* r_1 + h_2 r_2^* \quad (2)$$
$$= h_1^*(h_1 s_1 + h_2 s_2 + n_1) + h_2(-h_1 s_2^* + h_2 s_1^* + n_2)^*$$
$$= (|h_1|^2 + |h_2|^2) s_1 + h_1^* n_1 + h_2 n_2^*$$

$$\hat{s}_2 = h_2^* r_1 + h_1 r_2^*$$
$$= h_2^*(h_1 s_1 + h_2 s_2 + n_1) + h_1(-h_1 s_2^* + h_2 s_1^* + n_2)^*$$
$$= (|h_1|^2 + |h_2|^2) s_2 + h_2^* n_1 + h_1 n_2^*$$

It may be seen that both the transmitted symbols S1 and S2 achieve full spatial diversity.

Figure 4:
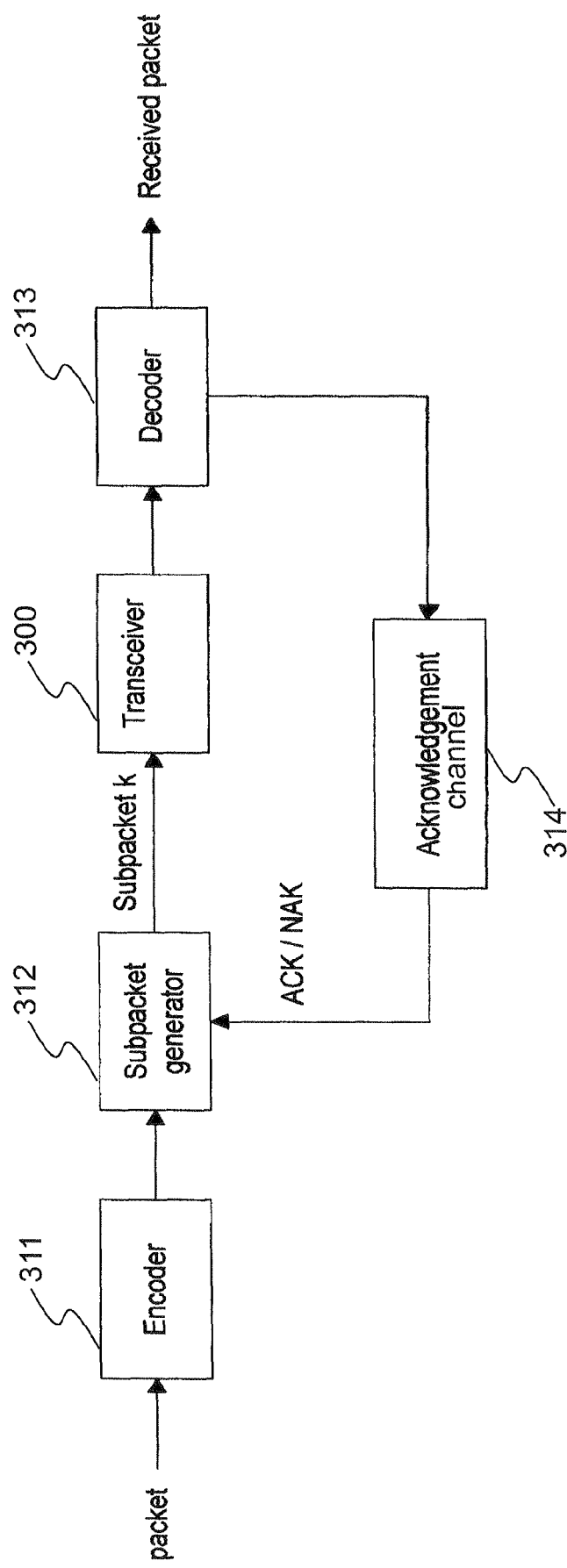
FIG. 4 is an illustration of Hybrid Automatic Repeat reQuestion (HARQ) operation.

Hybrid Automatic Repeat reQuestion (HARQ) is widely used in communication systems to combat decoding failure and improve the reliability of data transmission. A HARQ operation is shown in FIG. 4. FIG. 4 is an illustration of Hybrid Automatic Repeat reQuestion (HARQ) operation. A data packet is coded by using an encoder 311 with a certain kind of Forward Error Correction (FEC) scheme. The data packet is processed by a subpacket generator 312 and a set of subpackets are generated. A subpacket, for example, a subpacket k may only contain a portion of the coded bits. If the transmission by a transceiver 300 for subpacket k fails, as indicated by a NAK negative acknowledgement provided by a feedback acknowledgement channel 314, a retransmission subpacket, subpacket k+1, is provided to retransmit this data packet. If subpacket k+1 is successfully transceived, an ACK acknowledgement is provided by feedback acknowledgement channel 314. The retransmission subpackets may contain different coded bits from previous subpackets. The receiver may softly combine or jointly decode all the received subpackets by a decoder 313 to improve the chance of decoding. Normally, a maximum number of transmissions is configured in consideration of both reliability, packet delay, and implementation complexity.

Figure 5:
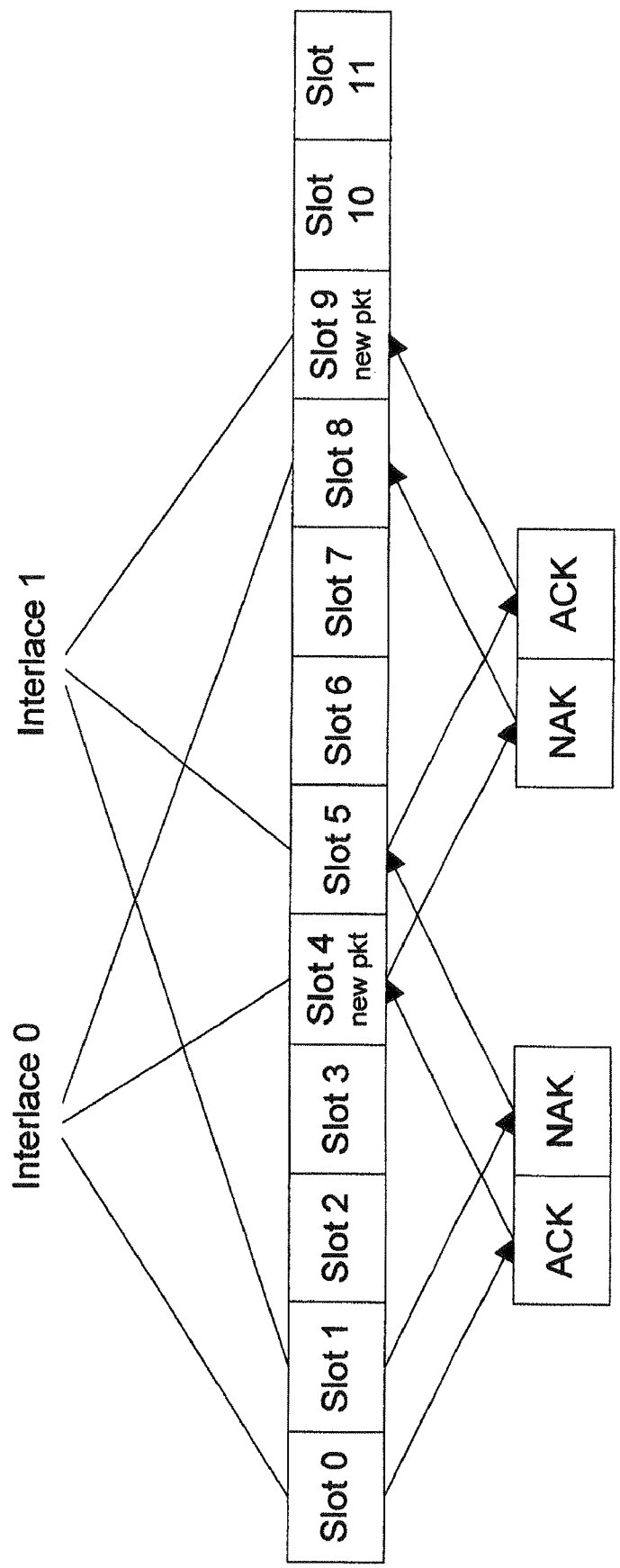
FIG. 5 shows an example of a four-channel synchronous Hybrid Automatic Repeat reQuestion (HARQ) operation.

N-channel synchronous Hybrid Automatic Repeat reQuestion (HARQ) is often used in wireless communication systems because of the simplicity. For example, synchronous Hybrid Automatic Repeat reQuestion (HARQ) has been accepted as the Hybrid Automatic Repeat reQuestion (HARQ) scheme for long term evolution (LTE) uplink in 3GPP. FIG. 5 shows an example of a four-channel synchronous Hybrid Automatic Repeat reQuestion (HARQ) operation. Because of the fixed timing relationship between subsequent transmissions, the transmission slots in an individual HARQ channel exhibits an interlace structure. For example, interlace 0 includes slot 0, 4, 8, . . . , 4k, . . . ; interlace 1 includes slot 1, 5, 9, . . . , 4k+1, . . . ; interlace 2 includes slot 2, 6, 10, . . . , 4k+2, . . . ; interlace 3 includes slot 3, 7, 11, . . . 4k+3 . . . . A packet is transmitted in slot 0. After correctly decoding the packet, the receiver sends back an ACK acknowledgement to the transmitter. The transmitter then starts transmitting a new packet at the next slot in this interlace, i.e., slot 4. The first subpacket of the new packet transmitted in slot 4, however, is not properly received. After the transmitter receives a NAK negative acknowledgement from the receiver, the transmitter transmits another sub-packet of the same packet at the next slot in interlace 0, i.e., slot 8. Interlaces 1-3 act in similar ways as interlace 0. Sometimes the receiver may have difficulty in detecting the packet boundary, i.e., whether a subpacket is the first sub-packet of a new packet or a retransmission sub-packet. To alleviate this problem, a new packet indicator may be transmitted in a control channel that carries transmission format information for the packet. Sometimes, a more elaborated version of HARQ channel information, such as sub-packet ID, and/or HARQ channel ID, may be provided to help the receiver detect and decode the packet.

Typically, there is more than one user sharing the uplink resource in the uplink using HARQ, resulting a need for the base-station to send multiple ACK signals in the downlink. These DL (down link) ACK channels should be multiplexed and transmitted using the available transmit diversity scheme at the base-station, in order to minimize the base-station resources usage in both transmission power and time-frequency transmission opportunity, for a given target coverage at a given bit error rate requirement. Because the solution in achieving this goal is not completed, one objective of the present invention is to provide a complete solution in achieving this goal of obtaining optimal base-station transmit signaling for DL ACK channels.

The term Dynamic Category 0 (Cat 0) bits is a LTE terminology used by the 3GPP LTE standard body. The role of Cat0 is to support dimensioning (scaling) of the downlink control channel by indicating the number of downlink and uplink scheduling grants. The current working assumption 3GPP RAN WG1#48bis Chairman's Notes, March 2007, Malta is that the dynamic Cat0 bits has a maximum size of 2 bits, and should be transmitted during every subframe where a control channel element (CCE) is present. The information conveyed by Cat0 bits includes, but is not limited to, the number of OFDM symbols used for all control channels in the subframe. The transmit diversity of the Cat0 bits is not finalized, and it is one of the objectives of the present invention to provide a simple and efficient transmission and reception diversity scheme that is enable to capture both spatial and frequency diversity in the channel.

Articles of interest are 3GPP RAN WG1#48bis Chairman's Notes, March 2007, Malta; and R1-050271, "Evaluation of Diversity in Evolved UTRA", Samsung, RAN1#40bis, Beijing China, April 2005.

In one embodiment of the invention, CDM (Code Division Multiplexing) is used in conjunction with cell-specific scrambling, in order to take advantage of interference averaging for a given repetition/transmission of the ACK channel, and to ensure interference randomization over several repetition/retransmission. Here, the spreading length of two is selected, and the resulting signal vector after spreading is mapped to a 2×1 resource unit (RU). Note that one RU covers two neighboring subcarriers and one Orthogonal Frequency Division Multiplexing (OFDM) symbol in the time-frequency resource mapping. b=[$b_1$,$b_2$] denotes the two ACK bits that are BPSK-modulated (binary phase shift keying modulated), S=[$s_1$,$s_2$] is the unitary spreading matrix where each spreading vector $s_1$,$s_2$ is of size 2×1, then the transmit signal a=[$a_1$, $a_2$] after CDM spreading is given by:

$$a = SWb = [s_1, s_2]\begin{bmatrix} w_1 b_1 \\ w_2 b_2 \end{bmatrix} \quad (3)$$

where W=diag[$w_1$,$w_2$] is a diagonal matrix indicating the transmission amplitude of the ACK bits.

In addition to the CDM method mentioned above, each signal vector a after spreading carries two BPSK-modulated ACK bits. The multiplexing capacity however may be doubled if both I and Q (real and imaginary) branches are used to carry different ACK bits with different power settings. Here, $b_i$=[$b_{1,i}$,$b_{2,i}$] is the two BPSK-modulated ACK bits to be carried on the I-branch (real branch) and $b_q$=[$b_{1,q}$,$b_{2,q}$] is the two BPSK-modulated ACK bits to be carried on the Q-branch (imaginary branch), S=[$s_1$,$s_2$] is the unitary spreading matrix where each of spreading vectors $s_1$,$s_2$ is of size 2×1, then the transmit signal a=[$a_1$,$a_2$] after CDM 2 spreading is given by:

$$a = S(W_i b_i + jW_q b_q) = [s_1, s_2]\begin{bmatrix} w_{1,i} b_{1,i} + jw_{1,q} b_{1,q} \\ w_{2,i} b_{2,i} + jw_{2,q} b_{2,q} \end{bmatrix} \quad (4)$$

where $W_i$=diag[$w_{1,i}$,$w_{2,i}$] and $W_q$=diag[$w_{1,q}$,$w_{2,q}$] are two diagonal matrices indicating the transmission amplitudes of the ACK bits on I and Q branches, respectively.

In the CDM and I/Q multiplexing approach, ACK channels having different power levels are multiplexed together. If the power imbalance between different ACK channels becomes too large, then any imperfection, such as channel estimation error and loss of CDM orthogonality due to slight channel variation within 2×1 RU, tends to penalize the low-power ACK channels more than the high-power ACK channels.

In order to mitigate this effect, a maximum power imbalance, $P_{IM}$ (dB), is imposed on the set of ACK channels. $P_1$, $P_2$, . . . , $P_K$ are powers (in dB) of the K (K is equal to or less than 4 with spreading gain of 2) ACK channels being multiplexed together. Without loss of generality, $P_1$ is set to be the largest power. Then the rest of ACK channels' powers (in dB) are adjusted by:

$$P_k' = \max(P_k, P_1 - P_{IM}), k=2, \ldots, K. \quad (5)$$

With a reasonable value of $P_{IM}$, for example, 10 dB, the additional power needed for the low-power ACK channels is minimal. This is due to the fact that the overall Node-B power consumption being dominated by the high-power ACK channels. In addition to the limitation on the power imbalance, the Node-B may also try to put two ACK channels with similar power settings on the I and Q branches of the same complex symbol. A complex symbol may be indicated by a complex number. A complex number (A+jB) indicating two A/N signals A and B. Here j (or i) indicate the imaginary number. The real part of the number (A+jB), A, is known as I-part, or in-phase part. And the imaginary part of the number (A+jB), B, is known as Q-part, or Quadrature part. The term Node B, in Universal Mobile Telecommunications System (UMTS), refers to a BTS (base transceiver station). The Node-B means base station in a cell.

The CDM multiplexing structure leads to a resource mapping method that consists of the following steps.

1. Each CDMed vector a is repeated R times, each repetition is mapped to a 2×1 RU; the number of total repetitions is fixed regardless of the number of Orthogonal Frequency Division Multiplexing (OFDM) control symbols N.

Figure 6:
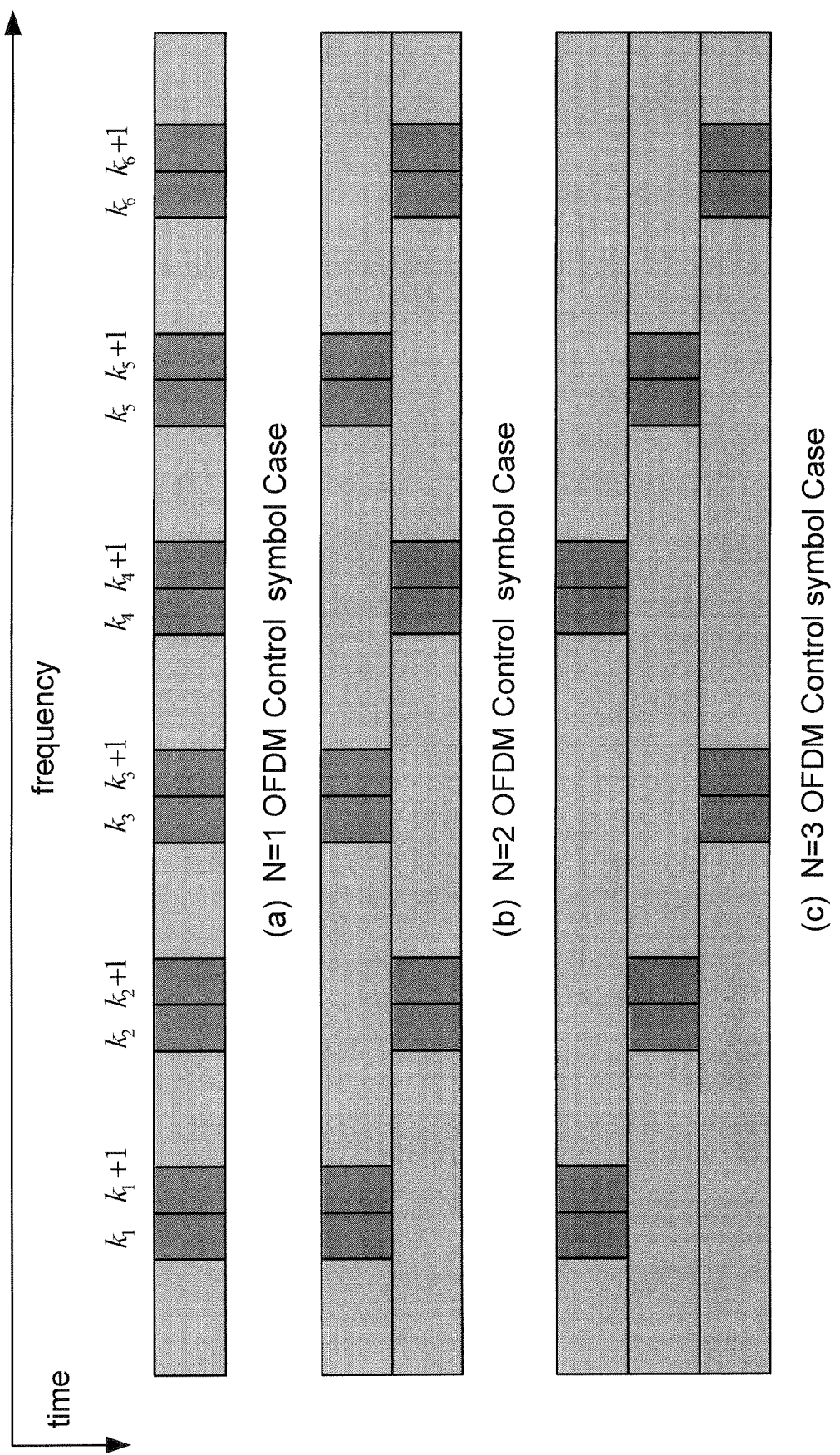
FIG. 6 illustrates an example of mapping Code Division Multiplexed (CDMed) Acknowledgment (ACK) channels to RE (receiver equipment) according to the principle of an embodiment of the present invention.
Figure 7:
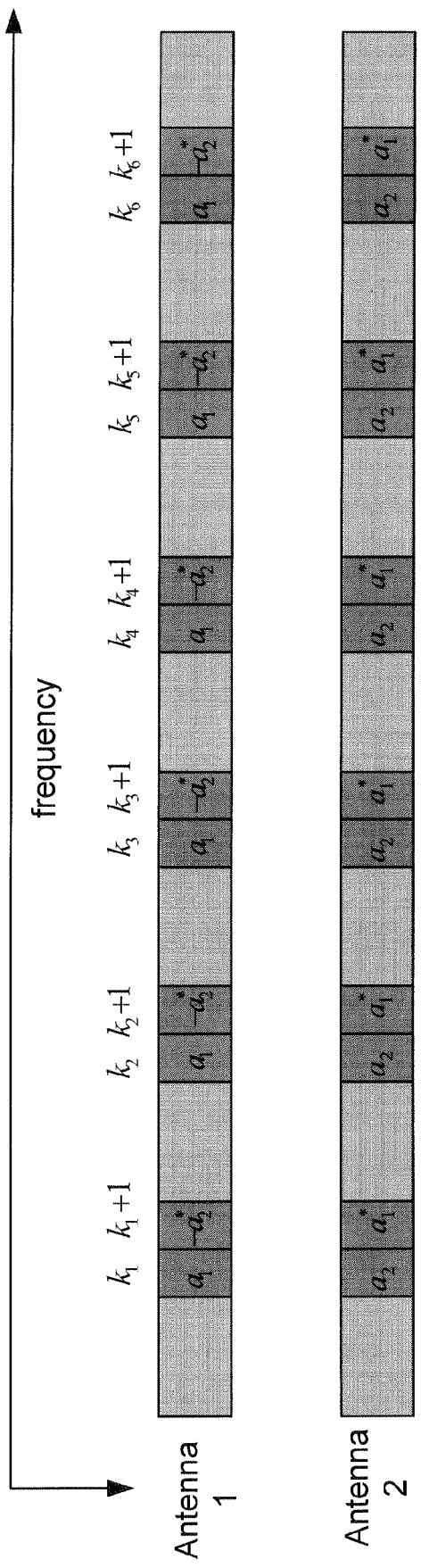
FIG. 7 illustrates an example of a method of mapping by using CDM (Code Division Multiplex)+SFBC (Space Frequency Block Coding)+repetition method for the case where the CDM spreading length is two and the number of repetition is six according to the principle of an embodiment of the present invention.

2. If N=1 Orthogonal Frequency Division Multiplexing (OFDM) symbol is used for control channels, then all R repetitions are transmitted in the first OFDM symbol, the R repetitions should be spread out in the frequency domain to capture frequency diversity. On the other hand, if N=2 or N=3 OFDM symbols are used, then these R repetitions may be spread out in both time and frequency domain to allow power sharing between OFDM symbols, while preserving the frequency diversity. FIG. 6 illustrates an example of mapping Code Division Multiplexed (CDMed) Acknowledgment (ACK) channels to RE (receiver equipment) according to the principle of an embodiment of the present invention. In this example, the number of repetitions is fixed as six. Vector a is repeatedly carried by two neighboring subcarriers $k_1$, $k_1+1$; $k_2$, $k_3+1$; $k_3$, $k_3+1$; $k_4$, $k_4+1$; $k_5$, $k_5+1$; $k_6$, $k_6+1$ $k_7$, $k_7+1$; and $k_8$, $k_8+1$. In the cases of N=2 or 3, the 2×1 RUs on different OFDM control symbols are staggered to maximize the frequency diversity gain. FIG. 7 illustrates an example of a method of mapping by using CDM (Code Division Multiplex)+SFBC (Space Frequency Block Coding)+repetition method for the case where the CDM spreading length is two and the number of repetition is six according to the principle of an embodiment of the present invention. Here the transmit diversity scheme is considered for the two transmitting antennas case and only the first symbol in the subframe is shown in FIG. 7. The CDM-ed vector a is transmitted R times in repetition. In each transmission, the 2 symbols $[a_1, a_2]$ are mapped to a 2×1 RU using SFBC (Space Frequency Block Coding) across both of the transmitting antennas. The scheme is illustrated in FIG. 7 for the case of N=1 OFDM control symbol, where R=6 repetitions are used. The same SFBC with repetition may be used for the N=2 and N=3 cases as well. At Antenna 1, symbol $a_1$ as I branch is allocated at subcarrier $k_1$ and symbol $-a_2^*$ as Q branch is carried by subcarrier $k_1+1$, and same scenario may be applied to the remaining repetitions. At Antenna 2, symbol $a_2$ as I branch is carried at subcarrier $k_1$ and symbol $a_1^*$ as Q branch is carried at subcarrier $k_1+1$, and same scenario is applied to the rest repetitions. A subframe consists of 14 OFDM symbols in a normal CP (cyclic prefix) case, and the OFDM control symbols takes the first 1-3 OFDM symbols. The exact number of OFDM symbols is indicated by Category0 bits, or the PCFICH channel.

Assuming the channel on each antenna does not vary in each 2×1 RU, the orthogonality of the spreading matrix S is preserved and the UE only requires a simple dispreading, in addition to standard SFBC diversity combining operation. In this case, a diversity order of 2 is achieved with each repetition, and six repetitions may achieve a diversity order of up to 12, if there is enough frequency selectivity in the propagation channel. The space and frequency block coding (SFBC) is also applicable to a four transmitting antennas system.

In a multi-cell environment, one would like to avoid the case where all R repetitions of an ACK channel from Cell A collide consistently with all R repetitions of an ACK channel from Cell B. In order to avoid these collisions, a so-called interference averaging gain is developed in a multi-cell environment. Cell-specific hopping is one approach to avoid such consistent collision and to ensure interference averaging gain. For a given case of N Orthogonal Frequency Division Multiplexing (OFDM) control symbols, the simplest hopping scheme is the random hopping across all the time-frequency resources, on the assumption of the 2×1 granularity of RU being preserved in the hopping process.

In another embodiment of the invention, a CDM of spreading length 4 is used in tandem with the I/Q domain multiplexing. Here, $b_i = [b_{1,i}, \ldots, b_{4,i}]$ indicates 4 BPSK-modulated ACK/NACK bits to be carried on the i-branch (real branch) and $b_q = [b_{1,q}, \ldots, b_{4,q}]$ indicates 4 BPSk-modulated ACK/NACK bits to be carried on the q-branch (imaginary branch), $S = [s_1, \ldots, s_4]$ is the unitary spreading matrix where each spreading vector $s_1, \ldots, s_4$ is of size 4×1, then the transmit signal $a = [a_1, \ldots, a_4]$ after CDM spreading is given by:

$$a = S(W_i b_i + jW_q b_q) = [s_1, \ldots, s_4] \begin{bmatrix} w_{1,i} b_{1,i} + jw_{1,q} b_{1,q} \\ \vdots \\ w_{4,i} b_{4,i} + jw_{4,q} b_{4,q} \end{bmatrix} \quad (6)$$

where $W_i = \text{diag}[w_{1,i}, \ldots, w_{4,i}]$ and $W_q = \text{diag}[w_{1,q}, \ldots, w_{4,q}]$ are two diagonal matrices indicating the transmission amplitudes of the ACK bits on I and Q branches, respectively.

Figure 8:
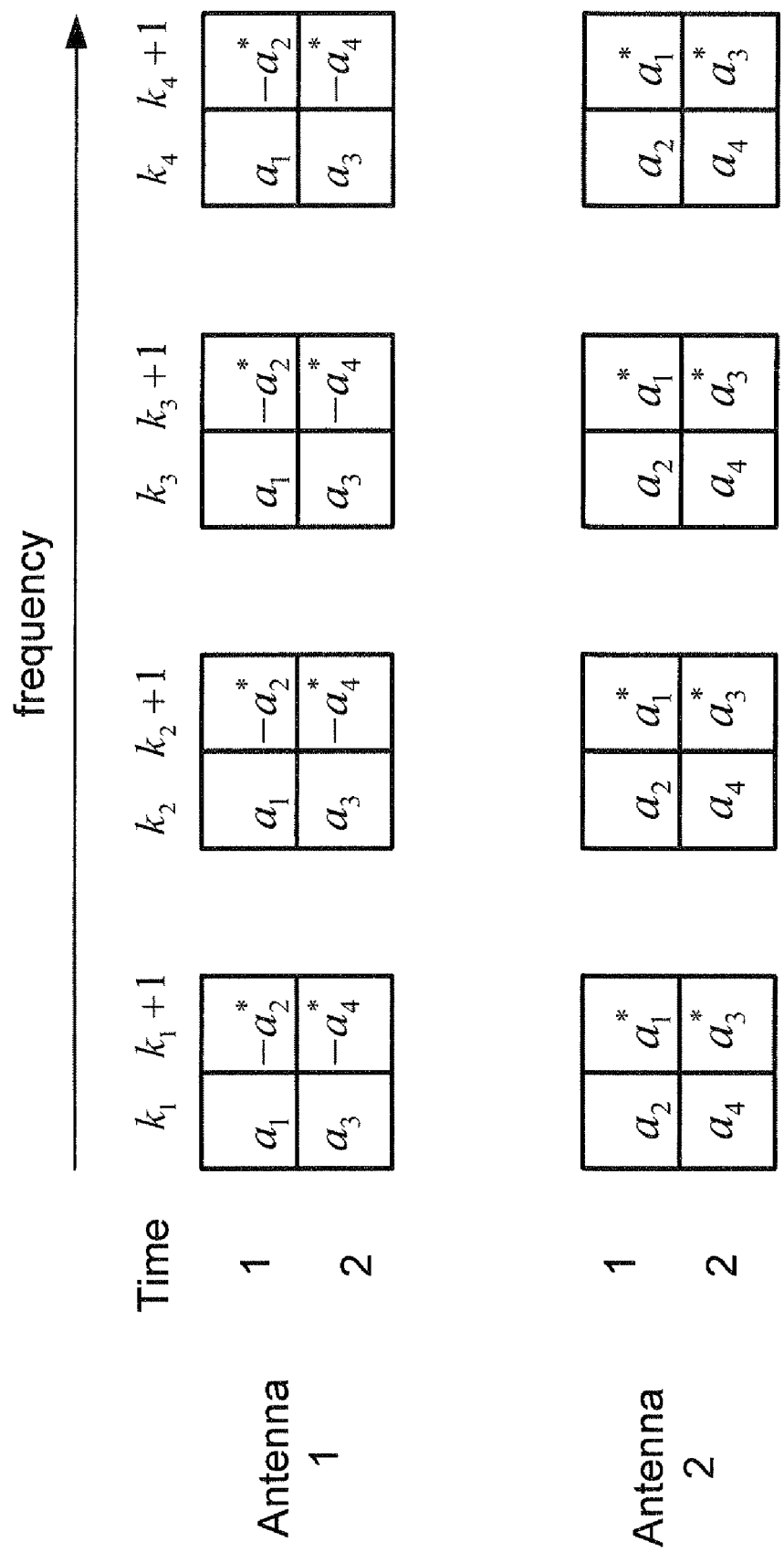
FIG. 8 illustrates an example of mapping by using CDM (Code Division Multiplex)+SFBC (Space Frequency Block Coding)+repetition method for the case where the CDM spreading length is four and the number of repetition is four according to the principle of another embodiment of the present invention.

FIG. 8 illustrates an example of mapping by using CDM (Code Division Multiplex)+SFBC (Space Frequency Block Coding)+repetition method for the case where the CDM spreading length is four and the number of repetition is four according to the principle of another embodiment of the present invention. In this case, vector a is transmitted N times in repetition in the frequency domain. In each transmission, however, the first two symbols $[a_1, a_2]$ are mapped to a contiguous 2×1 (2 sub-carrier, 1 OFDM symbol) RU using SFBC across both transmit antennas; whereas the next two bits $[a_3, a_4]$ are mapped to the neighboring 2×1 RU in the next OFDM symbol, also using SFBC across both transmit antennas. First two symbols $[a_1, a_2]$ is carried by subcarriers $k_1$, $k_1+1$ at time 1, and next two symbols $[a_3, a_4]$ are carried by subcarriers $k_1$, $k_1+1$ at time 2. Therefore, in order to send each repetition of vector a, a 2×2 RU is required. A 2×2 RU covers two neighboring subcarriers and two OFDM symbols. The scheme is illustrated in FIG. 8, where R=4 repetitions (encompassing four 2×2 RUs) are shown.

Figure 9:
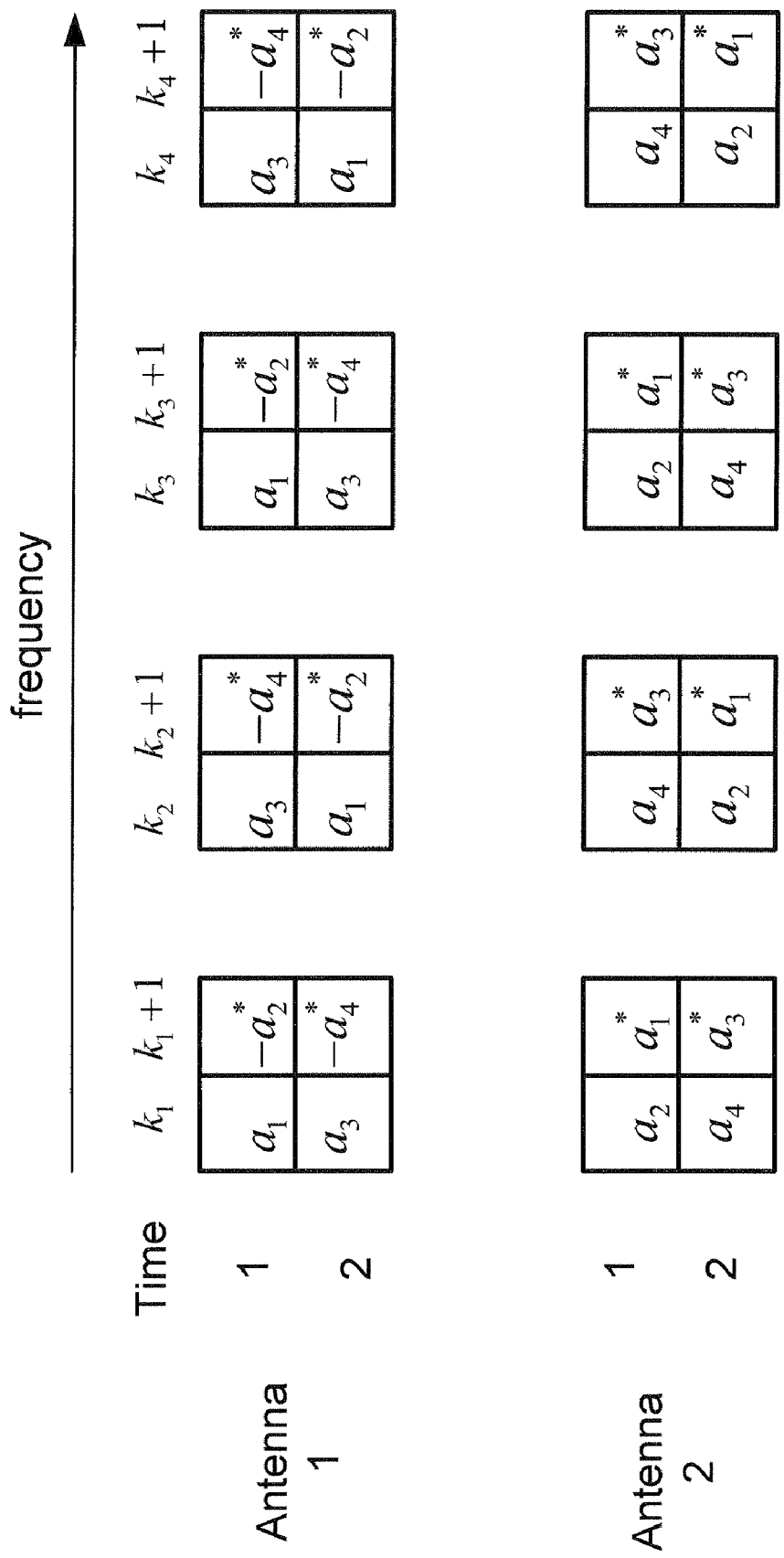
FIG. 9 illustrates an example of alternating the mapping of two pairs of symbols in different transmissions and the permutation of the pairs across different pairs of the symbols for the mapping method as shown in FIG. 8 according to the principle of another embodiment of the present invention.

Due to spreading and different power settings, the symbols in the vector $a = [a_1, \ldots, a_4]$ have different amplitudes. If the power difference between the pair $[a_1, a_2]$ and the pair $[a_3, a_4]$ is significant, then the consistent mapping of these two pairs of symbols to the two 2×1 RUs in all repetitions in FIG. 8 may cause power imbalance in the two OFDM symbols. FIG. 9 illustrates an example of alternating the mapping of two pairs of symbols in different transmissions and the permutation of the pairs across different pairs of the symbols for the mapping method as shown in FIG. 8 according to the principle of another embodiment of the present invention. This issue may be easily rectified by alternating the mapping of these two pairs of symbols in different transmissions, as shown in FIG. 9. Compared with scheme as shown in FIG. 8, at the fourth repetition as shown in FIG. 9, the next 2 symbols $[a_3, a_4]$ are carried by the symbol transmitted at Time 1 at both of Antenna 1 and Antenna 2 and the first 2 symbols $[a_1, a_2]$ are by the symbol transmitted at Time 2 at both of Antenna 1 and Antenna 2.

In another embodiment, the invention utilizes the following transmit diversity scheme for the transmission of Cat0 bits.

1. When four states are required for Cat0 bits, QPSK (quadrature phase-shift keying) modulation may be used; when three states are required for Cat0 bits, 3PSK modulation may be used. The modulated Cat0 symbol is represented by a.

2. The Cat0 bits are always transmitted in the first Orthogonal Frequency Division Multiplexing (OFDM) symbol within a sub-frame. The reason for this approach is that: if the Cat0 mapping is allowed to vary according to the number of OFDM control symbols, an additional hypothesis testing may be needed and more transmission power and resource are needed to achieve the same BER (Bit-error rate) performance. On the other hand, if the Cat0 mapping is fixed to more than one OFDM symbol, for example, to three OFDM symbols in all subframes, encounter data puncturing issues may occur if the actual OFDM control symbol used is less than 3.

3. The modulated symbol a is repeated by 2K times, however, these 2K symbols are mapped to 2×1 resource units (RU) where each RU includes two neighboring subcarriers in one OFDM symbol in the time-frequency resource mapping. Therefore, 2K symbols will be mapped to a number of K resource units (RUs). These RUs should be spread out in the frequency domain in order to obtain maximum frequency diversity gain. The reason for this 2×1 RU granularity is for allowing the Cat0 resource mapping to easily fit the overall framework of CCE to RE mapping.

4. Frequency selective transmit diversity (FSTD) with repetition is used for two transmitting antennas. SFBC (Space Frequency Block Coding) is not recommended here because all of the modulated symbols are identical and FSTD may achieve same spatial diversity gain. Therefore, additional UE complexity of SFBC may be avoided.

Figure 10:
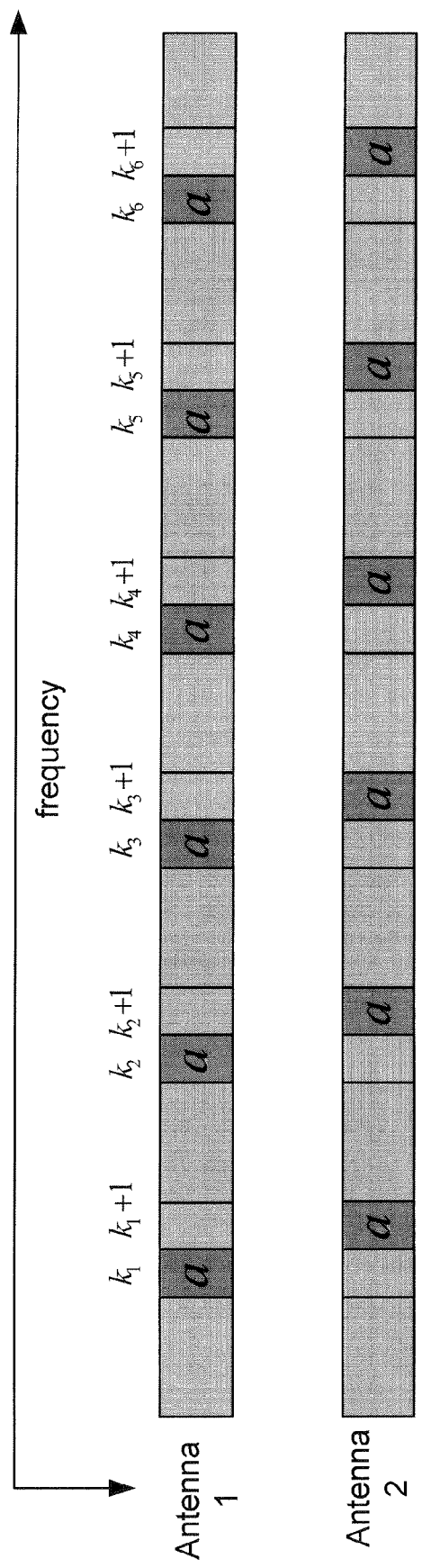
FIG. 10 illustrates an example of mapping modulated Category 0 symbols to the RE (receiver equipment), FSTD (using Frequency Selective Transmit Diversity)+repetition for the case where the number of repetition is six according to the principle of another embodiment of the present invention.

This method is clearly illustrated in FIG. 10. FIG. 10 illustrates an example of mapping modulated Category 0 symbols to the RE (receiver equipment), FSTD (using Frequency Selective Transmit Diversity)+repetition for the case where the number of repetition is six according to the principle of another embodiment of the present invention. In this example, K is equal to six. Note that only the first Orthogonal Frequency Division Multiplexing (OFDM) symbol in the subframe is shown in FIG. 10. As shown in FIG. 10, vector a is carried by one subcarrier $k_1, k_2, k_3, k_4, k_5$, and $k_6$ at Antenna 1, and vector a is carried by one subcarrier $k_1+1, k_2+1, k_3+1, k_4+1, k_5+1$, and $k_6+1$ at Antenna 2. Unlike the schemes as shown in FIGS. 7-10, vector a as a whole is allocated at a designated subcarrier instead of being allocated in different subcarriers in the scheme as shown in FIG. 10.

In a multi-cell environment, one would like to avoid the case where all 2K repetitions of the Cat0 symbols from Cell A collide consistently with all 2K repetitions of the Cat0 symbols from Cell B. In order to avoid these collisions, so-called interference averaging gain is proposed in a multi-cell environment. Cell-specific hopping is one approach to avoid such consistent collision and to ensure interference averaging gain.

One parameter to be determined is the number of repetitions needed for Cat0 symbols, which is defined as 2K (K is the number of resource units (RUs)) in the previous sections. Here, the "worst-case" scenario performance is evaluated for the Cat0 symbols, where 98% coverage of BER (bit-error rate) of 0.1% is required for the LTE (Long Term Evolution) Case 3 network configuration. The LTE Case 3 is one of the simulation scenarios defined by the LTE studies, and is captured from 3GPP TR 25.814. It is known that the geometry value (Ior/Ioc) at the 98% coverage point is approximately −6.7 dB for LTE Case 3.

Figure 11:
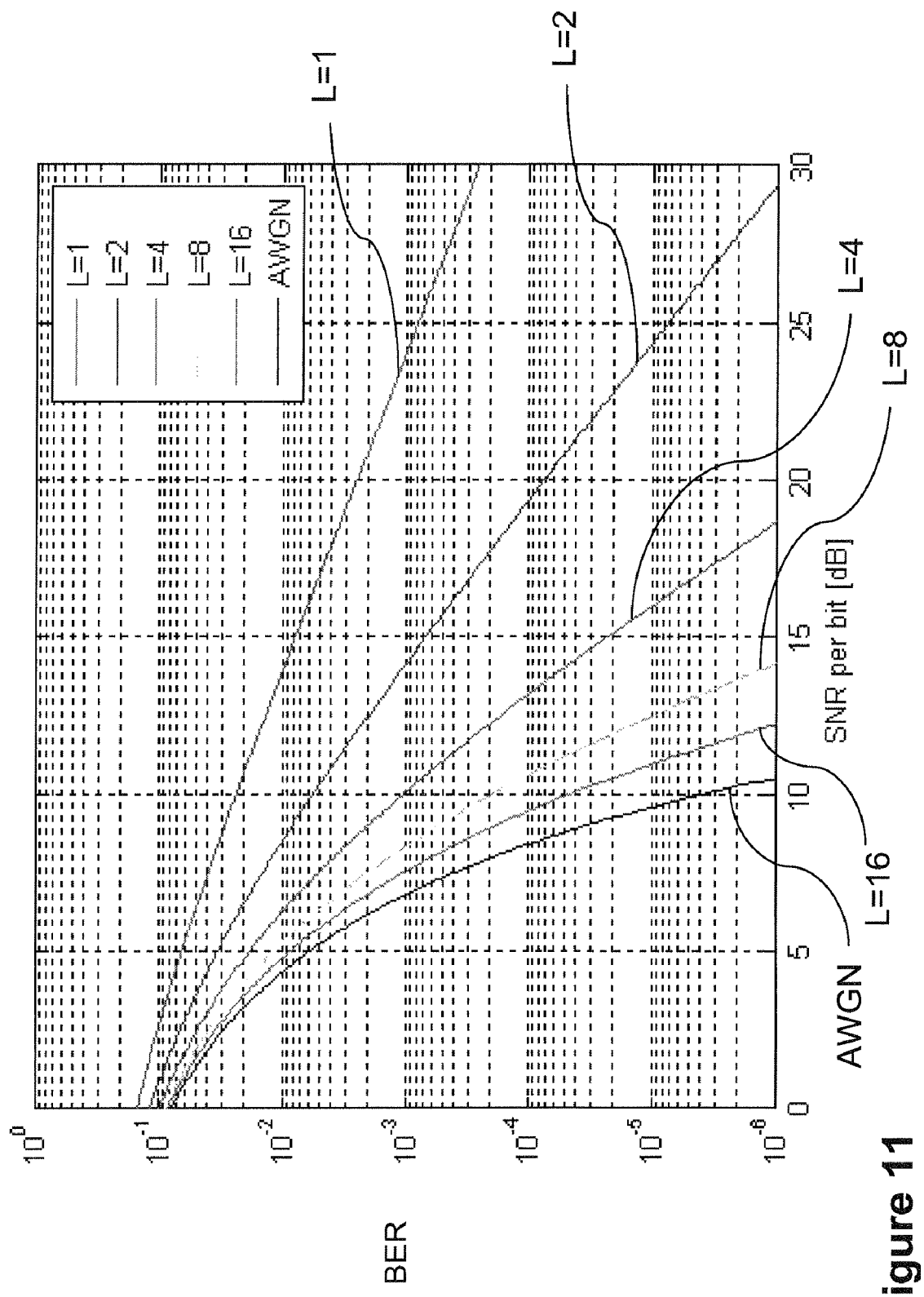
FIG. 11 is a graph of Logarithmic scale illustrating Bit-error rate (BER) performance with different diversity receptions.

The un-coded BER for diversity reception is shown in FIG. 11 that is extracted from reference [2]. FIG. 11 is a graph of Logarithmic scale illustrating Bit-error rate (BER) performance with different diversity receptions. The AWGN is a white Gaussian noise channel model and system performances with different diversity orders are shown in FIG. 11. On the assumption of a target diversity order of 8 (i.e., L=8), 0.1% BER (i.e., BER=$10^{-3}$) is achieved by an $E_b/N_o$ of 8 dB is required, which may be translated to 11 dB $E_s/N_o$ for QPSK-modulated Cat0 symbols. Now a gap value of the 98% coverage point is approximately −6.7 dB and thus $E_s/N_o$ is 11+6.7=17.7 dB. Here, $E_b/N_o$ is Energy per bit to noise power spectral density ratio and is a normalized signal-to-noise ratio (SNR) measure, also known as the "SNR per bit". $E_s/N_o$ is Energy per symbol per noise power spectral density. To bridge this gap, a combination of power boosting and repetition may be requested. When the number of repetition to be 2L=12 is chosen (L is the order of diversity), the repetition gain is $10 \log_{10}(12)$=10.8 dB, which leaves about a 17.7−10.8=6.9 dB gap to be filled by power boosting. If the number of repetitions is increased to 2L=16, the repetition gain is $10 \log_{10}(16)$=12 dB and the power boost required is 17.7−12=5.7 dB. Note that this analysis does not account for the loss in channel estimation and an additional margin of from 2 dB to 3 dB is needed depending on the channel estimation algorithm. In conclusion, for the diversity order of 8, a repetition number of 2L=12 to 2L=16 is likely needed for QPSK modulated Cat0 symbol to ensure the "worst case" BER performance.

In another embodiment of the invention, the two subcarriers in the 2×1 RU used for one repetition of the Cat0 bits may not be neighboring subcarriers. In another word, 2K repetitions of Cat0 symbols may be mapped to individual subcarriers $k_1, k_2, \ldots, k_{2K}$ as shown in FIG. 10, while Frequency Selective Transmit Diversity (FSTD) is also used to maximize the diversity gain in both spatial and frequency domain.

In another embodiment of the invention, orthogonal spreading with repetition for Cat0 symbols may be used. For each repetition, Cat0 symbol a is spread across space and frequency using an ortho-normal matrix onto the 2×1 RU that spans the two neighboring subcarriers. Some examples of transmission matrix T from this ortho-normal spreading include, but not limited to equation (7):

$$T_0 = \begin{bmatrix} a & -a^* \\ a & a^* \end{bmatrix}, T_1 = \begin{bmatrix} a & a^* \\ a & -a^* \end{bmatrix}, T_2 = \begin{bmatrix} a & a \\ a & -a \end{bmatrix} \quad (7)$$

$$T_3 = \begin{bmatrix} a & -a \\ a & a \end{bmatrix}, T_4 = \begin{bmatrix} a & -ja \\ a & ja \end{bmatrix}, T_5 = \begin{bmatrix} a & ja \\ a & -ja \end{bmatrix}.$$

where a* represents the complex conjugate of a.

Note that the row-permuted versions of the above matrices are also feasible ortho-normal spread matrices. In this scheme, similar to the scheme as shown in FIG. 10, a number of K 2×1 RUs (each spans two neighboring subcarriers and one OFDM symbol) each one of the K 2×1 RUs that are used, one of the ortho-normal matrices are used to map the symbol a onto space-frequency resource. For a designated matrix (for example matrix $T_0$) selected from equation (7), the element on row m, column n is denoted by $[T_0]_{m,n}$ and $[T_0]_{m,n}$ represents the symbol transmitted on the mth antenna and the nth subcarrier or nth time slot (m=1,2 n=1,2) for the case of 2-Tx antennas. Note that applying $T_0$ ortho-normal spread is equivalent to using SFBC (Space Frequency Block Coding).

In another embodiment, the invention utilizes another transmit diversity scheme for the ACK channels such that:

1. Either one ACK channel is BPSK-modulated into a symbol or two ACK channels are both BPSK-modulated, but I/Q multiplexed into symbol a. No CDM is used in multiplexing.

2. An (FSTD+repetition) scheme similar to the one shown in FIG. 10 is used for the modulated ACK symbol.

In another embodiment, the present invention uses a (3,2,2) binary linear code to map the 2 Cat0 bits into a 3-bit codeword $c_1c_2c_3$, and this codeword belongs to a codebook of size four with a minimum Hamming distance of two between any pairs of codewords. A linear code of length n, of rank k (i.e., having k code words in as basis and k rows in its generating matrix), and of minimum hamming distance d is referred to as an (n, k, d) code. Here, length n is 3, k is 2 and refers to "0" and "1" as base, and hamming distance d here is 2. One example of such a codebook C is $c_1c_2c_3 \in C = \{111, 100, 010\ 001\}$ when three states are carried by Cat0 bits. Once the 3-bit codeword is specified, it will be repeated and rate-matched to fit the 2K channel symbols to be used for the Cat0 bits. Here, QPSK modulation is used for the coded channel bits. For example, if 2K=12 channel symbols are available, 2×12=24 channel bits exist. Therefore, the codeword $c_1c_2c_3$ will be repeated 8 times to form a 24-bit long coded bit sequence, and then the QPSK modulation is used to map this sequence of 24 bit into the 12 channel symbols. In addition, the rate-matching process is needed in the case if 4K is not divisible by 3. In this case, the codeword $c_1c_2c_3$ is repeated $\lfloor 4K/3 \rfloor$ times (i.e., a quotient of 4K/3), and the resulting sequence is concatenated with the first $4K-3 \times \lfloor 4K/3 \rfloor$ (i.e., a remainder of 4K/3) bits in the codeword $c_1c_2c_3$. This concatenated bit sequence is the final channel bit sequence to be modulated and mapped into channel symbol.

In another embodiment of the invention, when 4 states need to be carried by 2 Cat0 bits, the choice of the codeword $c_1c_2c_3$ is limited to the subset of the codebook, where the size of this subset is three codewords. For example, one possible subset of the codebook C is $c_1c_2c_3 \in C_{subset} = \{111, 100, 010\}$.

Figure 12:
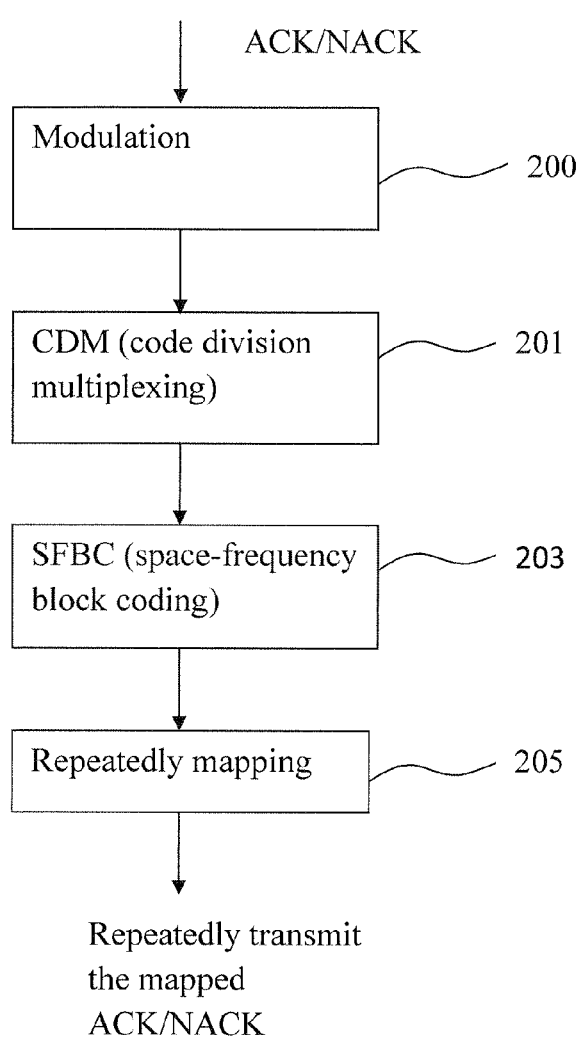
FIG. 12 shows a flowchart of transmitting ACK/NACK signals and a flowchart of receiving the ACK/NACK signals.
Figure 12:
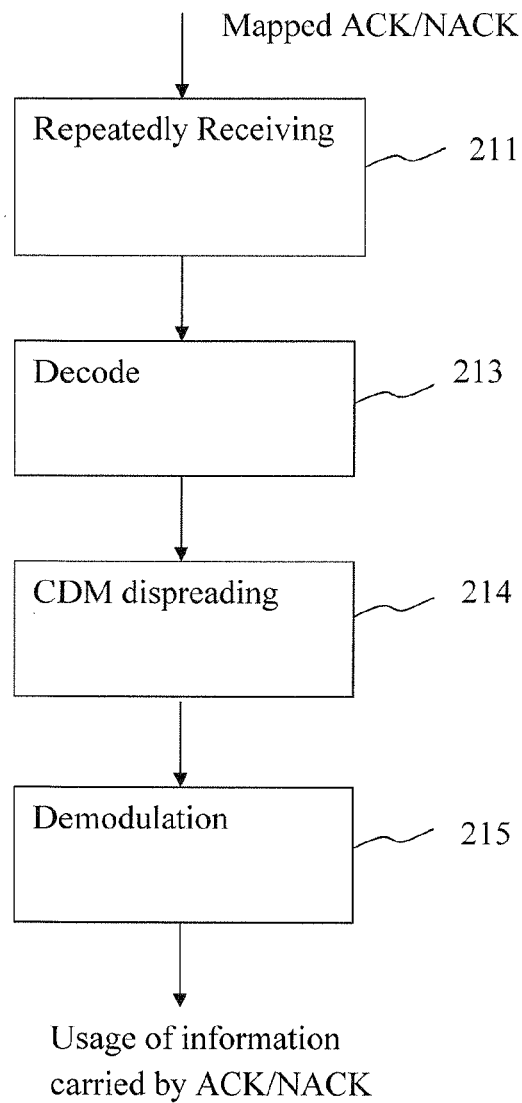

In FIG. 12, a flowchart of transmitting ACK/NACK signals and a flowchart of receiving the ACK/NACK signals are shown. In the flowchart of transmitting ACK/NACK signals, step 200 is a step of modulating the ACK/NACK signal by binary phase shift keying modulation; step 201 is a step of multiplexing the modulated ACK/NACK signal by code division multiplexing coding (CDM); step 203 is a step of mapping, by space-frequency block coding, the multiplexed modulated ACK/NACK signal to a resource unit having a pair of neighboring subcarriers and a predetermined number of Orthogonal Frequency Division Multiplexing (OFDM) control symbols; and step 205 is a step of repeatedly transmitting for predetermined times the multiplexed ACK/NACK with each of repetitions of transmitting the multiplexed signal repeatedly mapped to a plurality of discrete resource units spread in a frequency domain. In the flowchart of receiving ACK/NACK signals, step 211 is a step, operated by the receiver equipment, of repeatedly receiving the transmitted ACK/NACK signals from the base station; step 213 is a step of decoding the coded ACK/NACK; step 214 is s step of dispreading the coded ACK/NACK; step 215 is a step of demodulating the modulated ACK/NACK. The receiver equipment then utilizes the information carried by the received ACK/NACK signals.

Figure 13:
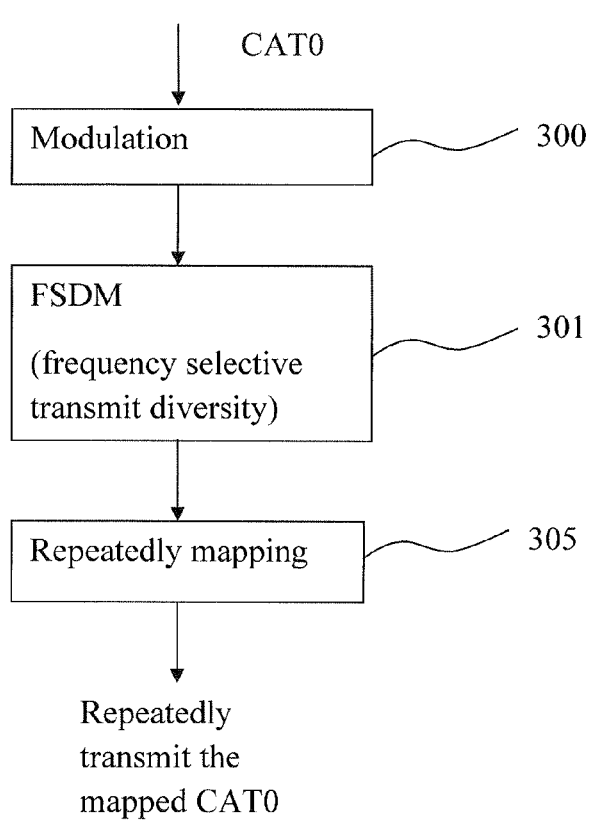
FIG. 13 shows a flowchart of transmitting ACK/NACK signals and a flowchart of receiving the Category 0 (CAT0) signals
Figure 13:
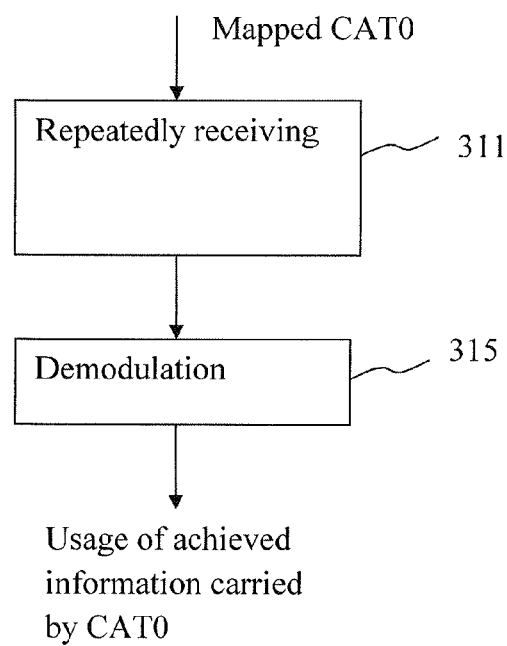

In FIG. 13, a flowchart of transmitting a Category 0 (CAT 0) signal and a flowchart of receiving the Category 0 (CAT 0) signals are shown. In the flowchart of transmitting Category 0 (CAT 0) signal, step 300 is a step of modulating the Category 0 (CAT 0) signal by QPSK (quadrature phase-shift keying) modulation or 3PSK (three phase shift keying) modulation; step 301 is a step of mapping the CAT 0 signal by FSDM (frequency selective transmit diversity); step 305 is a step of repeatedly transmitting for predetermined times the multiplexed CAT0 signal. In the flowchart of receiving CAT 0 signals, step 311 is a step, operated by the receiver equipment, of repeatedly receiving the transmitted CAT 0 signal from the base station; and step 315 is a step of demodulating the modulated CAT 0 signal. The receiver equipment then utilizes the information carried by the received CAT 0 signals.

What is claimed is:

1. A method for transmitting a signal, comprising steps of:
    multiplexing, at a base station in a cell comprising the base station and corresponding receiver equipments, the signal to be sent to one of the receiver equipments by using a first matrix and a second matrix;
    mapping, by space-frequency block coding, the multiplexed signal to a resource unit comprising a pair of neighboring subcarriers and a predetermined number of Orthogonal Frequency Division Multiplexing (OFDM) control symbols; and
    repeatedly transmitting for predetermined times, at the base station in the cell, the multiplexed signal with each of repetitions of transmitting the multiplexed signal repeatedly mapped to a plurality of discrete resource units spread in a frequency domain.

2. The method of claim 1, with the multiplexing being Code Division Multiplexing (CDM), the first matrix being a unitary spreading matrix and the second matrix being a diagonal matrix indicating a transmission amplitude of the signal, and the signal being from a BPSK-modulated (binary phase shift keying modulated) acknowledgement/non-acknowledgement signal (ACK/NACK signal), where one constellation point in BPSK modulation indicates ACK value and the other constellation point in BPSK modulation indicates NACK value.

3. The method of claim 2, when a spreading length of the BPSK-modulated ACK/NACK signal is two, a transmit signal $a = [a_1, a_2]$ transformed from the BPSK-modulated ACK/NACK signal by the CDM is defined by:

$$a = SWb = [s_1, s_2] \begin{bmatrix} w_1 b_1 \\ w_2 b_2 \end{bmatrix}$$

where b=[$b_1$,$b_2$] is two BPSK-modulated ACK/NACK bits; S=[$s_1$,$s_2$] is the unitary spreading matrix where each of spreading vectors $s_1$,$s_2$ is of size 2×1; and W=diag[$w_1$, $w_2$] is the diagonal matrix indicating the transmission amplitude of the BPSK-modulated ACK/NACK bits.

4. The method of claim 3, with each of the plurality of discrete resource units comprising a pair of subcarriers and one OFDM control symbol.

5. The method of claim 4, when a total of four ACK/NACK signals are carried by both of a real branch and an imaginary branch with different power settings, a first portion of ACK/NACK signals is carried on the real branch and a second portion of ACK/NACK signals is carried on the imaginary branch, the transmit signal a=[$a_1$,$a_2$] transformed from the BPSK-modulated ACK/NACK signal by the CDM is defined:

$$a = S(W_i b_i + jW_q b_q) = [s_1, s_2] \begin{bmatrix} w_{1,i} b_{1,i} + jw_{1,q} b_{1,q} \\ w_{2,i} b_{2,i} + jw_{2,q} b_{2,q} \end{bmatrix}$$

where $b_i$=[$b_{1,i}$,$b_{2,i}$] is the two BPSK-modulated ACK/NACK bits carried on the real branch and $b_q$=[$b_{1,q}$,$b_{2,q}$] is two BPSK-modulated ACK/NACK bits carried on the imaginary branch; S=[$s_1$,$s_2$] is the unitary spreading matrix where each of spreading vectors $s_1$,$s_2$ is of size 2×1; $W_i$=diag[$w_{1,i}$,$w_{2,i}$] and $W_q$=diag[$w_{1,q}$,$w_{2,q}$] are two diagonal matrices respectively indicating the transmission amplitudes of the BPSK-modulated ACK/NACK bits carried by the real branch and the imaginary branch.

6. The method of claim 5, further comprising steps of:
setting a maximum power imbalance for all of ACK/NACK channels;
selecting a channel having a highest power level among all of the ACK/NACK channels; and
adjusting power levels of the ACK/NACK channels different from the selected channel having the highest power level among all of the ACK/NACK channels by:

$P_k' = \max(P_k, P_I - P_{IM})$, k=2, ..., K.

where $P_k'$ is the adjusted power level of a designated ACK/NACK channel different from the channel having the highest power level among all of the ACK/NACK channels; $P_k$ is an original power level of the designated ACK/NACK channel; $P_I$ is the highest power level among all of the ACK/NACK channels; and $P_{IM}$ is the set maximum power imbalance.

7. The method of claim 6, with the set maximum power imbalance being 10 dB.

8. The method of claim 1, with the predetermined times of the repetitions of transmitting the multiplexed signal being fixed regardless of a total number of OFDM control symbols in a subframe.

9. The method of claim 8, when the total number of OFDM control symbol is one, all of the repetitions of transmitting the multiplexed signal are allocated in a leading OFDM symbol in the subframe and are spread out in the frequency domain to maximize a frequency diversity.

10. The method of claim 8, when the total number of OFDM control symbol is more than one, the repetitions of transmitting the multiplexed signal are evenly allocated in each of the control OFDM symbols in the subframe and are spread out in the frequency domain to maximize the frequency diversity.

11. The method of claim 4, when the BPSK-modulated ACK/NACK signal being transmitted by two transmitting antennas, the multiplexed signal being mapped by using a space and frequency block coding method across the two transmitting antennas.

12. The method of claim 2, when more than one cell transmit the BPSK-modulated ACK/NACK signals at one time and the total number of OFDM control symbol in one subframe is one, further comprising a step of cell-specific hopping.

13. The method of claim 2, when more than one cell transmit the BPSK-modulated ACK/NACK signals at one time and the total number of OFDM control symbol within one subframe is more than one, further comprising a step of random hopping across time-frequency resources with the resource units being preserved in the hopping process.

14. The method of claim 2, when the spreading length of the BPSK-modulated ACK/NACK signal is four and a total of eight BPSK-modulated ACK/NACK signals are carried by both of the real branch and the imaginary branch, the transmit signal a=[$a_1$, ..., $a_4$] transformed from the BPSK-modulated ACK/NACK signal by the CDM is defined by:

$$a = S(W_i b_i + jW_q b_q) = [s_1, \ldots, s_4] \begin{bmatrix} w_{1,i} b_{1,i} + jw_{1,q} b_{1,q} \\ \vdots \\ w_{4,i} b_{4,i} + jw_{4,q} b_{4,q} \end{bmatrix}$$

where $b_i$=[$b_{1,i}$, ..., $b_{4,i}$] indicates four BPSK-modulated ACK/NACK bits carried on the real branch; $b_q$=[$b_{1,q}$, ..., $b_{4,q}$] indicates four BPSK-modulated ACK/NACK bits carried on the imaginary branch; S=[$s_1$, ..., $s_4$] is the unitary spreading matrix where each spreading vector $s_1$, ..., $s_4$ is of size 4×1; and $W_i$=diag[$w_{1,i}$, ..., $W_{4,i}$] and $W_q$=diag[$w_{1,q}$, ..., $w_{4,q}$] are two diagonal matrices respectively indicating the transmission amplitudes of BPSK-modulated ACK/NACK bits on real branch and the imaginary branch.

15. The method of claim 14, when the BPSK-modulated ACK/NACK signal being transmitted by two transmitting antennas, the multiplexed signal being mapped by using a space and frequency block coding method across the two transmitting antennas.

16. A method for transmitting Category 0 bits, comprising steps of:
modulating the Category 0 bits by a predetermined method based upon a number of states of the Category 0 bits;
carrying the Category 0 bits on a leading Orthogonal Frequency Division Multiplexing (OFDM) symbol within a subframe;
mapping the modulated Category 0 bits by a frequency selective transmit diversity (FSTD) method; and
repeatedly transmitting, for predetermined times, the modulated Category 0 bits with each of repetitions of transmitting the modulated Category 0 bits being spread in a frequency domain and being mapped to a plurality of discrete resource units each comprising a pair of subcarriers and a predetermined number of Orthogonal Frequency Division Multiplexing (OFDM) control symbols.

17. The method of claim 16, with the predetermined times of repetitions of transmitting the modulated Category 0 bits being a number of two times of a number of the plurality of discrete resources units.

18. The method of claim 17, when more than one cell are transmitting the Category 0 bits at one time, further comprising a step of cell-specific hopping.

19. The method of claim 16, with the plurality of discrete resource units each comprising a pair of neighboring subcarriers and one Orthogonal Frequency Division Multiplexing (OFDM) control symbols.

20. The method of claim 19, when the Category 0 bits are transmitted by two transmitting antennas and the plurality of discrete resource units at the two transmitting antennas having identical structures in the frequency domain, for a first transmitting antenna, the modulated Category 0 bits being mapped in a first subcarrier of the pair of neighboring subcarriers within each of the plurality of discrete resource units; and for a second transmitting antenna, the modulated Category 0 bits being mapped in a second subcarrier of the pair of neighboring subcarriers within each of the plurality of discrete resource units with the second subcarrier different from the first subcarrier.

21. The method of claim 20, further comprising a step of orthogonal spreading by applying an ortho-normal matrix to the plurality of discrete resource units.

22. The method of claim 21, with the ortho-normal matrix being one selected from:

$$T_0 = \begin{bmatrix} a & -a^* \\ a & a^* \end{bmatrix}, T_1 = \begin{bmatrix} a & a^* \\ a & -a^* \end{bmatrix}, T_2 = \begin{bmatrix} a & a \\ a & -a \end{bmatrix}$$

$$T_3 = \begin{bmatrix} a & -a \\ a & a \end{bmatrix}, T_4 = \begin{bmatrix} a & -ja \\ a & ja \end{bmatrix}, T_5 = \begin{bmatrix} a & ja \\ a & -ja \end{bmatrix}.$$

where element $[T]_{m,n}$ represents that the Category 0 bits are transmitted on an mth transmitting antenna and an nth subcarrier or an nth time slot (m=1,2 n=1,2).

23. The method of claim 19, further comprising steps of:
mapping the Category 0 bits into a three-bit codeword of a codebook by a (3,2,2) binary linear code based upon the number of states of the Category 0 bits;
when a number of four times of the number of the plurality of discrete resources units is divisible by three, repeating the three-bit codeword for predetermined times in order to form a bit sequence with the predetermined times being the number of two times of the number of the plurality of discrete resources units;
rate matching the bit sequence into the plurality of discrete resource units; and
transmitting the bit sequence carrying information of the Category 0 bits.

24. The method of claim 23, when the number of states of the Category 0 bits is four, for each of states of the Category 0 bits, with the three-bit codeword being selected from the codebook being a group of "111", "100", "010" and "001" corresponding to a designated state of Category 0 bits.

25. The method of claim 24, further comprising steps of:
when the number of four times of the number of the plurality of discrete resources units is not divisible by three, repeating the three-bit codeword for predetermined times in order to form a sub bit sequence of the bit sequence, with the predetermined times being defined by a floor of a quotient of 4K/3, i.e., ⌊4K/3⌋ in a mathematical expression, where K is a number of resource units; and
generating the bit sequence by concatenating the sub bit sequence with a number of leading bits of the selected codeword corresponding to the designated state of Category 0 bits with the number of leading bits being a remainder of 4K/3, i.e., 4K−3⌊4K/3⌋ in mathematical expression.

26. The method of claim 23, when the number of states of the Category 0 bits is three, for each of states of the Category 0 bits, with the three-bit codeword being one selected from a sub-codebook consisting a group of any three of "111", "100", "010" and "001" corresponding to the designated state of Category 0 bits.

27. The method of claim 16, with the predetermined times of repetitions of transmitting the modulated Category 0 bits being from a range of 12 to 16.

28. The method of claim 16, with the plurality of discrete resource units comprising two discrete subcarriers and the predetermined number of Orthogonal Frequency Division Multiplexing (OFDM) control symbols.

29. The method of claim 16,
when the Category 0 bits comprises four states, with the modulating being a QPSK (quadrature phase-shift keying) modulation; and
when the Category 0 bits comprises three states, with the modulating being a 3PSK (three phase shift keying) modulation.

30. A method of transmitting acknowledgement (ACK)/non-acknowledgement (NACK) signal, comprising steps of:
modulating the ACK/NACK signal by using a binary phase shift keying (BPSK) method;
carrying the modulated ACK/NACK signal on a real branch and an imaginary branch;
mapping the modulated ACK/NACK signal by a frequency selective transmit diversity (FSTD); and
transmitting repeatedly, for predetermined times, modulated ACK/NACK signal with each of repetitions of transmitting the modulated ACK/NACK signal being spread in a frequency domain and being mapped to a plurality of discrete resource units each comprising a pair of subcarriers and a predetermined number of Orthogonal Frequency Division Multiplexing (OFDM) control symbols.

31. A method for transmitting a signal, comprising steps of:
multiplexing, at a base station in a cell comprising the base station and corresponding receiver equipments, the signal to be sent to one of the receiver equipments by using a first matrix and a second matrix;
mapping, by space-frequency block coding, the multiplexed signal to a resource unit comprising a pair of neighboring subcarriers and two Orthogonal Frequency Division Multiplexing (OFDM) control symbols; and
repeatedly transmitting for predetermined times, at the base station in the cell, the multiplexed signal with each of repetitions of transmitting the multiplexed signal repeatedly mapped to a plurality of discrete resource units spread in a frequency domain.

32. The method of claim 31, within each of the plurality of discrete resource units, with two leading bits of the signal being mapped to a first pair of subcarriers within a first OFDM control symbol and two ending bits of the signal being mapped to a second pair of subcarriers having same frequencies as the first pair of subcarriers within a second OFDM control symbol.

33. The method of claim 31, within each of the plurality of discrete resource units, with the two leading bits of the signal and the two ending bits of the signal being alternately mapped to the first pair of subcarriers within the first OFDM control symbol.

* * * * *